July 8, 1958 — L. S. BILLMAN — 2,841,952
REAR INLET ANNULAR DIFFUSER
Filed Feb. 9, 1955
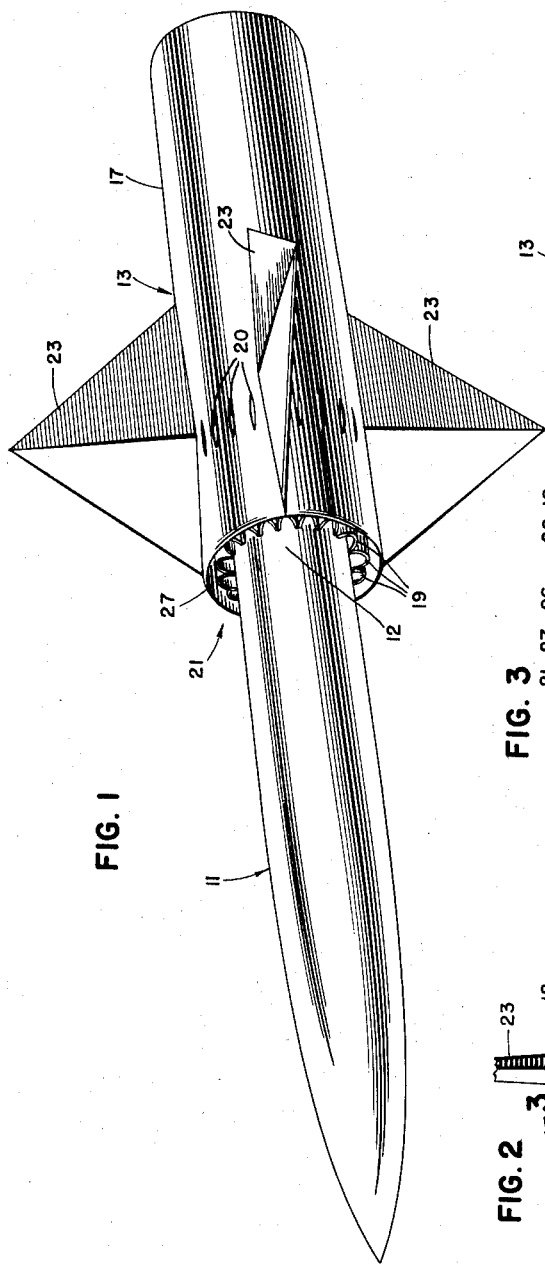
FIG. I
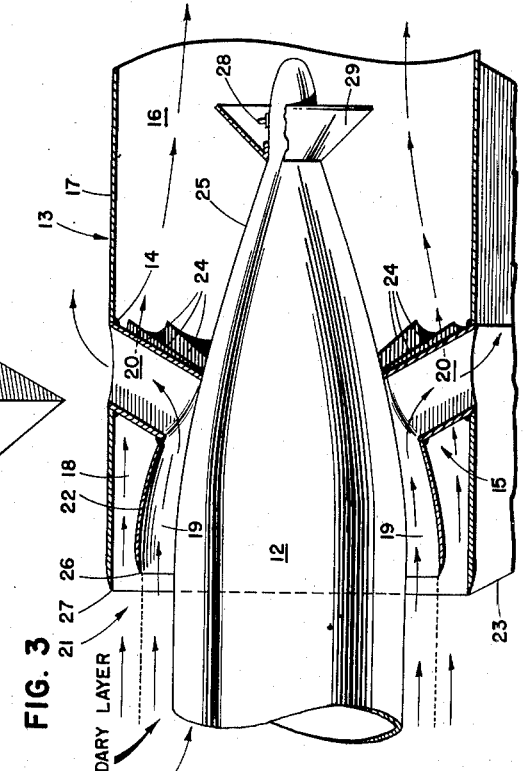
FIG. 3
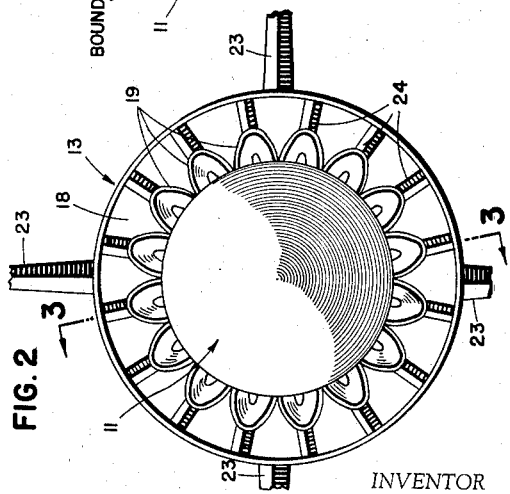
FIG. 2
INVENTOR
LOUIS S. BILLMAN
BY
ATTORNEYS United States Patent Office 2,841,952
Patented July 8, 1958

2,841,952

REAR INLET ANNULAR DIFFUSER

Louis S. Billman, Lancaster, Calif., assignor, by mesne assignments, to the United States of America as represented by the Secretary of the Navy Application February 9, 1955, Serial No. 487,226

2 Claims. (Cl. 60—35.6)

The present invention relates to a rear inlet annular diffuser for supersonic aircraft and more particularly to a rear inlet annular diffuser for supersonic aircraft which is capable of venting the boundary layer of air adjacent the aircraft body to the atmosphere to substantially prevent its entry into the combustion chamber of the aircraft.

According to this invention the diffuser and combustion chamber unit is attached to the rear section of a supersonic aerodyne unlike the usual positioning of such power units within the midsection and rear section of a continuous duct which extends from the forwardmost or air inlet portion of the supersonic aircraft to the exhaust portion or extreme tail thereof.

The capability of mounting the diffuser and combustion chamber unit of the present invention on the rear section of an aircraft permits air intake and exhaust of the aircraft power unit to be confined to the rearward area of the aerodyne thereby obviating the need for complicated forward body structure which normally is designed to include a large amount of space-consuming duct work. Further, the air intake characteristics of this invention make it possible to achieve a better air flow for fuel mixing by removal of the body boundary layer air to the atmosphere. The turbulence of this boundary layer has been found to be detrimental to proper fuel mixing which results in an uneven burning of the mixture in the combustion chamber leading to nonuniform thrust of the supersonic aerodyne.

An object of the present invention is the provision of a device for preventing low energy air flow from entering the combustion area of an air consuming power unit for supersonic aircraft.

Another object is to provide a diffuser for supersonic aircraft which may be mounted on the rear of an aircraft fuselage to permit access to the aircraft body.

A further object is the provision of a diffuser for supersonic aircraft which disposes of the boundary layer of air surrounding a missile body and conducts high pressure air to the combustion chamber of the aircraft.

Other objects and many of the attendant advantages of this invention will be readily appreciated as the same becomes better understood by reference to the following detailed description when considered in connection with the accompanying drawings wherein:

Fig. 1 is a perspective view of a supersonic aircraft having the invention mounted thereon;

Fig. 2 is a front elevation on an enlarged scale of the embodiment of Fig. 1; and Fig. 3 illustrates a longitudinal view partly in section taken substantially along line 3—3 of Fig. 2 looking in the direction of the arrows.

There is shown in Fig. 1 a supersonic aerodyne having a fuselage 11, pencil-like in design for purposes of illustration. Concentrically positioned about a rear portion 12 of fuselage 11 is a power unit 13 having air inlet and exhaust portions. The power unit 13 is cylindrical in shape to parallel the outer surface of rear portion 12 to which it is fixedly engaged by any suitable support structure such as streamlined struts connected to fuselage 11 by common fastening means as, for example, welded joints 14. The cylindrical shape of the power unit 13 would necessarily be changed to conform with any chosen outer surface configuration of the rear portion 12 of fuselage 11.

The cylindrical power unit 13 is comprised of two sections, a front diffuser section 15 and a rear combustion section 16 which is not unlike the combustion chambers of conventional ramjets. The cylindrical wall 17 of power unit 13 forms an enclosing structure for both the diffuser and combustion sections and is concentrically spaced apart from the fuselage 11 to form an air inlet passage 18 defined by the fuselage surface and the cylindrical wall 17.

Referring to Fig. 2 it can be seen that radially positioned within diffuser section 15 are a plurality of arched ducts 19 fixedly engaged one to the other in adjacent relationship within the air inlet passage 18. The lower boundary of the arched ducts 19 is defined by the fuselage rear portion 12 and the height of the arched duct 19 is less than the height of the air inlet passage 18 so that inlet air may follow an unrestricted path from a main annular diffuser inlet 21 on the rear portion 12 of fuselage 11 to the combustion section 16 between the cylindrical wall 17 and the duct surfaces 22. Stabilizer fins 23 are diametrically opposed on the outer surface of diffuser section 15 and extend perpendicular thereto to stabilize the aircraft in flight in conventional fashion.

In Fig. 3 it is shown that the arched ducts 19 rearwardly decrease in cross-sectional area to join with faired hollow struts 24 which open to the atmosphere in the form of oval-shaped apertures 20 whose major axes lie in parallel relationship to the longitudinal axis of the cylindrical power unit 13. The openings of hollow struts 24 may be flush with the outer surface of the power unit to decrease skin friction of the supersonic aerodyne. Hollow struts 24 are positioned intermediate the tail 25 of fuselage 11 and the air inlet 21 such that boundary layer air existing near the surface of fuselage 11 may be rammed into the arched ducts 19 which are in contact with the rear portion 12 of fuselage 11, and through the arched ducts 19 and hollow struts 24 to the slip stream or atmosphere surrounding the power unit as the aerodyne progresses through the air at supersonic speeds. This boundary layer of air, which is normally a mass of turbulent subsonic air, is aided in its passage through ducts 19 and hollow struts 24 by the kinetic effect of the supersonic air stream which passes the openings of hollow struts 24 during supersonic missile flight.

Both the leading edge 26 of arched ducts 19 and the leading edge 27 of the cylindrical power unit 13 are knife-edged to offer the minimum resistance to air flow. The leading edges 26 of ducts 19 are spaced rearwardly of leading edge 27 of the cylindrical power unit 13 to eliminate the introduction of interference between leading edges to the smooth passage of air into the inlet 21. It will be noted, Fig. 3, that the arcuate-shaped wall or surface 22 of each duct 19 is shaped to form an air entrance opening at the upstream leading edge 26 thereof and which converges as it extends downstream and is shaped to form an oval-shaped opening at the trailing edge thereof, the opening being in communication with the opening 20 in strut 24.

A smooth flow of ram air is allowed to pass to the combustion section 16 through the area in passage 18 not occupied by ducts 19 and hollow struts 24 for fuel mixing by suitable apparatus, not shown, and ignition by an igniter 28 which may be stationed on tail 25 and surrounded by a flame holder 29 fixed to the tail 25 and conical in configuration with the cone opening toward the rear.

Obviously, many modifications and variations of the present invention are possible in the light of the above teachings. It is therefore to be understood that within the scope of the appended claims the invention may be practiced otherwise than as specifically described.

What is claimed is:

1. A ramjet aerodyne comprising a divergent-convergent fuselage, flame holder and fuel ignition means provided on the rear section of the fuselage, a walled housing fixed to and enclosing the rear section of said fuselage in spaced relation with respect thereto and having a combustion chamber in which said flame holder and fuel ignition means are arranged, the leading edge of said housing being disposed in a vertical plane passing normal to said fuselage at a location just forward of the convergency of the fuselage, the trailing edge of said housing being disposed in a vertical plane normal to said fuselage at a location to the rear of the fuselage, a plurality of ducts each of which is provided with a leading and trailing edge and circumferentially disposed about said rear section of the fuselage with the leading edge thereof spaced a predetermined distance rearwardly from the leading edge of the housing for providing an annular air inlet defined by said fuselage and housing, each of said ducts having an arcuate-shaped wall in cross section with the terminal ends thereof secured along the peripheral surface of said rear section, said arcuate-shaped wall of each duct being shaped to form an air entrance opening upstream at said leading edge thereof and to converge as it extends downstream and to form an oval-shaped opening at said trailing edge thereof, an oval-shaped hollow strut carried by each of said walls and secured to said housing for supporting and maintaining said housing in spaced relation with respect to said fuselage and in communication with said ducts and with the atmosphere through an oval-shaped passageway formed in each of said struts and in registration with complementary peripherally spaced oval-shaped openings formed in the housing whereupon air entering said annular inlet in the path of travel of said entrance openings will flow through the ducts, struts and complementary openings in said housing to the atmosphere, said ducts and struts providing a plurality of mutually spaced passageways between said ducts and housing, the area of the passageways being greater than the area of said entrance openings in said ducts whereupon air entering said annular air inlet may follow an unrestricted path through said passageways to the fuel ignition means in said combustion chamber.

2. A diffuser for a supersonic ramjet aircraft comprising a housing fixed to and enclosing the rear converging cylindrical section of the ramjet aircraft in spaced relation with respect thereto and having a combustion chamber therein, a plurality of ducts each of which is provided with a leading and trailing edge and circumferentially disposed about said rear section with the leading edge thereof spaced a predetermined distance rearwardly from the leading edge of the housing for providing an annular air inlet defined by said rear cylindrical section of the aircraft and the housing, each of said ducts having an arcuate-shaped wall in cross section with the terminal end thereof secured along the peripheral surface of the cylindrical section, said arcuate-shaped wall of each of the ducts is shaped to form an air entrance opening upstream at said leading edge thereof and converges as it extends downstream and is shaped to form an oval-shaped opening at said trailing edge thereof, an oval-shaped hollow strut carried by each of said walls and secured to said housing for supporting and maintaining the housing in spaced relation with respect to the rear section and in communication with said ducts and with the atmosphere through an oval-shaped passageway formed in each of said struts and in registration with complementary peripherally spaced oval-shaped openings formed in the housing whereupon air entering said annular inlet in the path of travel of said entrance openings will flow through the ducts, struts and complementary opening to the atmosphere, said ducts and struts providing a plurality of circumferentially spaced passageways between the ducts and housing, the area of the passageways being greater than the area of said entrance openings in the ducts whereupon air entering said annular air inlet in the path of travel of the passageways may flow unobstructed therethrough and into the combustion chamber.

References Cited in the file of this patent

UNITED STATES PATENTS

| 2,596,435 | Robert | May 13, 1952 |
| 2,638,738 | Salter | May 19, 1953 |
| 2,720,754 | Francois | Oct. 18, 1955 |

FOREIGN PATENTS

| 579,758 | Great Britain | Aug. 14, 1946 |